US006671976B2

(12) United States Patent
Takahashi et al.

(10) Patent No.: US 6,671,976 B2
(45) Date of Patent: Jan. 6, 2004

(54) OUTPUT-ATTACHED MEASURING INSTRUMENT

(75) Inventors: Seigo Takahashi, Kawasaki (JP); Masamichi Suzuki, Kawasaki (JP); Kouji Sasaki, Kawasaki (JP); Yoshiaki Shiraishi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/217,605

(22) Filed: Aug. 14, 2002

(65) Prior Publication Data

US 2003/0040207 A1 Feb. 27, 2003

(30) Foreign Application Priority Data

Aug. 21, 2001 (JP) ....................................... 2001-250742

(51) Int. Cl.[7] .............................. G01B 3/18; H01R 4/58

(52) U.S. Cl. ............................. 33/784; 33/705; 33/793; 439/86; 439/587

(58) Field of Search ........................... 439/86, 89, 271, 439/587; 33/783, 784, 788, 789, 813, 819, 820, 703, 705, 793

(56) References Cited

U.S. PATENT DOCUMENTS

| | | | | | |
|---|---|---|---|---|---|
| 4,176,897 | A | * | 12/1979 | Cameron | 439/138 |
| 4,491,688 | A | * | 1/1985 | Schaub et al. | 178/19.01 |
| 4,612,656 | A | | 9/1986 | Suzuki et al. | 377/24 |
| 4,712,557 | A | * | 12/1987 | Harris | 607/37 |
| 4,720,269 | A | * | 1/1988 | Haskins et al. | 439/90 |
| 4,736,313 | A | | 4/1988 | Nishimura et al. | 702/162 |
| 4,763,286 | A | | 8/1988 | Nishimura et al. | 702/82 |
| 4,862,598 | A | * | 9/1989 | Barlow et al. | 33/613 |
| 5,052,121 | A | * | 10/1991 | Wachtler | 33/813 |
| 5,063,687 | A | * | 11/1991 | Olshefsky | 33/827 |
| 5,067,250 | A | * | 11/1991 | Auweiler et al. | 33/783 |
| 5,141,444 | A | * | 8/1992 | Redmond et al. | 439/59 |
| 5,740,616 | A | * | 4/1998 | Seddon et al. | 33/554 |
| 5,822,876 | A | * | 10/1998 | Haas et al. | 33/533 |
| 5,870,833 | A | * | 2/1999 | Van Bebber et al. | 33/554 |
| 5,884,240 | A | * | 3/1999 | Edgar et al. | 702/157 |
| 6,105,269 | A | * | 8/2000 | Kondrat | 33/512 |
| 6,332,278 | B1 | * | 12/2001 | Bezinge et al. | 33/784 |
| 6,403,226 | B1 | * | 6/2002 | Biernath et al. | 428/447 |
| 6,405,447 | B2 | * | 6/2002 | Nyen | 33/645 |
| 6,497,051 | B1 | * | 12/2002 | Poole et al. | 33/784 |
| 6,502,057 | B1 | * | 12/2002 | Suzuki | 702/162 |

* cited by examiner

*Primary Examiner*—Diego Gutierrez
*Assistant Examiner*—R. Alexander Smith
(74) *Attorney, Agent, or Firm*—Oliff & Berridge, PLC

(57) ABSTRACT

An output-attached measuring instrument has: a measuring instrument body (1) having a circuit board (14) for processing a measurement signal from a sensor as a measurement data, an output electrode (15) for outputting the measurement data, and a connector hole (17) in communication with the output electrode and opening to an outer surface; and a connection cable (30) having a connector (32) capable of attaching to and detaching from the connector hole on an end thereof for transmitting the measurement data obtained by the measuring instrument body to an external device, the connector having a projection (33) capable of being plugged to and unplugged from the connector hole and a connector terminal (34) exposed on a surface thereof, where an elastic connector (20) having am electro-conductive portion for electrically connecting the connector terminal and the output electrode is accommodated in a space of the connector hole of the measuring instrument body and the elastic connector shuts the connector hole when the projection is unplugged from the connector hole and electrically connects the connector terminal and the output electrode through the electro-conductive portion when the projection is plugged into the connector hole.

10 Claims, 5 Drawing Sheets

OUTPUT-ATTACHED MEASURING INSTRUMENT

BACKGROUND OF THE INVENTION

1. Field of the Invention

The present invention relates to an output-attached measuring instrument. More specifically, it relates to an output-attached measuring instrument capable of outputting measurement data measured by a measuring instrument to the outside.

2. Description of Related Art

Conventionally, small measuring instruments (hand tool) manually held by an operator for measuring a workpiece, such as a caliper and a micrometer, have been widely used.

Among the hand tools, a caliper has a main scale, a slider capable of moving in longitudinal direction of the main scale, a displacement sensor for detecting the displacement of the slider as an electric signal and a digital display for digitally displaying the displacement of the slider detected by the displacement sensor.

Some of the calipers (output-attached caliper) are capable of outputting the displacement of the slider, i.e. a measurement signal, detected by the displacement sensor to the outside.

Conventionally, in order to manufacture the output-attached caliper, a connector connected to the displacement sensor and having an exposed electrode is formed on a part of the slider, and another connector fitted to the connector on the slider and having an exposed electrode connected to the electrode is attached to a tip end of a connection cable connected to an external device such as data processor.

In use, when the connector provided at the tip end of the connection cable is fitted to the connector formed on the slider, the electrodes provided on the connectors are mutually connected, so that the measurement signal obtained by the caliper is transmitted to an external device such as a data processor through the connection cable, where the measurement signal is processed.

However, according to such conventional output-attached measuring instrument, following disadvantage accompanied.

First, since the electrode is exposed on the connector, the use of the output-attached caliper under an undesirable condition where water, oil, and dust easily invades therein, was very difficult for fear of the invasion of the water, oil and dust etc.

Secondly, when the caliper is used under such undesirable condition, the fitted portion has to be covered by a rubber packing etc to prevent invasion of the foreign body, so that the structure of the caliper becomes complicated.

SUMMARY OF THE INVENTION

An object of the present invention is to provide an output-attached measuring instrument capable of solving the conventional problems and capable of using under a severe undesirable condition without employing complicated structure.

An output-attached measuring instrument according to an aspect of the present invention includes: a measuring instrument body having a sensor, a circuit board for processing a measurement signal from the sensor as a measurement data, an output electrode for outputting the measurement data from the circuit board, and a connector hole in communication with the output electrode and opening to an outer surface; and a connection cable having a connector capable of attaching to and detaching from the connector hole for transmitting the measurement data obtained by the measuring instrument body to an external device, the connector having a projection capable of being plugged to and unplugged from the connector hole and a connector terminal exposed on a surface thereof, where an elastic connector having am electro-conductive portion for electrically connecting the connector terminal and the output electrode is accommodated in a space of the connector hole of the measuring instrument body, and where the elastic connector shuts the connector hole when the projection is unplugged from the connector hole and electrically connects the connector terminal and the output electrode through the electro-conductive portion when the projection is plugged into the connector hole.

Alternatively, an output-attached measuring instrument according to the present invention includes: a measuring instrument body having a sensor, a circuit board for processing a measurement signal from the sensor as a measurement data, an output electrode for outputting the measurement data from the circuit board, and a connector hole in communication with the output electrode and opening to an outer surface, the measuring instrument body capable of transmitting the measurement data to an external device using a connection cable having a connector with a connector terminal exposed on a surface thereof and being capable of attaching to and detaching from the connector hole, the connector having a projection capable of being plugged to and unplugged from the connector hole, where an elastic connector having am electro-conductive portion for electrically connecting the connector terminal and the output electrode is accommodated in a space of the connector hole of the measuring instrument body, and where the elastic connector shuts the connector hole when the projection is unplugged from the connector hole and electrically connects the connector terminal and the output electrode through the electro-conductive portion when the projection is plugged into the connector hole.

According to the above arrangement, the measurement signal measured by the sensor of the measuring instrument body is processed by the circuit board as a measurement data to be sent to the output electrode.

While the projection is inserted into the connector hole, the connector terminal is in contact with the surface of the elastic connector and the output electrode and the connector terminal are electrically conducted by the electro-conductive portion provided on the outer surface of the elastic connector, so that the measurement data obtained by the measuring instrument body can be transmitted to an external device through the connection cable.

When the projection of the connector is unplugged from the connector hole, the connector hole is shut by the elastic connector. In other words, the outside and the output electrode are isolated. Accordingly, the invasion of the water, dust etc. from the outside through the connector hole into the output electrode and the circuit board can be prevented, and the situation where the data cannot be transmitted can be avoided, thus enabling to use the output-attached measuring instrument under severe environment.

Further, since the connector terminal and the output electrode are in contact through the elastic connector, secure contact can be obtained by the elastic contact pressure of the elastic connector and the connector terminal and the output electrode are less likely to be damaged even after repeated plugging and unplugging of the connector as compared to bringing the connector terminal and the output electrode into direct contact.

In the present invention, the connector hole may preferably include: a perpendicular channel perpendicular to the circuit board; and an opening channel bent from an end of the perpendicular channel and opening toward the outer surface of the measuring instrument body, where the elastic connector may preferably be provided in the perpendicular channel, the elastic connector shutting the opening channel when the projection is unplugged from the connector hole and electrically connecting the connector terminal and the output electrode while being elastically deformed when the projection is inserted into the connector hole.

Specifically, when the connector hole in communication with the outside is linearly provided from the output electrode, the output electrode is situated on a stress line from the projection when the projection is inserted into the connector hole. As a result, when the projection is inserted into the connector hole, the stress equal to the stress applied to the elastic connector by the projection is applied to the output electrode, thereby increasing the load applied on the output electrode.

On the other hand, according to the present invention, since the connector hole is bent at the border between the perpendicular channel and the opening channel and the elastic connector is arranged to shut the opening inside the perpendicular channel, the stress applied on the elastic connector by the projection is not directly applied on the output electrode, thereby reducing the load applied on the output electrode.

Further, an elastic body has characteristics of elastically deforming and expanding in a direction orthogonal with a stress direction. In other words, when the projection is inserted from the opening channel, the elastic connector is elastically deformed and expanded along the perpendicular channel, the elastic connector can be in contact with the output electrode at an appropriate pressure by the elastic deformation.

In the present invention, an elastic sealing member may preferably be provided along the periphery of the opening channel on the outer surface of the measuring instrument body, and the elastic sealing member may preferably seal the gap between the measuring instrument body and the connector while being compressed when the projection of the connector is inserted into the opening channel.

Since the elastic connector is elastically deformed when the projection of the connector is inserted into the connector hole, the connector hole is not shut by the elastic connector.

However, since the elastic sealing member is provided along the periphery of the opening, the connector hole is isolated from the outside by the close contact between the elastic sealing member and the connector when the connector is inserted. Accordingly, invasion of water, oil, dust etc. from the connector hole into the inside of the measuring instrument can be prevented, thus enabling use of the measuring instrument under severe environment.

In the present invention, a plurality of the electro-conductive portions connecting a surface opposing the opening channel and a surface opposing the output electrode may preferably be provided to the elastic connector sandwiching a non-electro-conductive portion therebetween.

According to the above arrangement, when the elastic connector touches the connector terminal and the output electrode from the surface facing the opening channel and the surface facing the perpendicular channel, the output electrode and the connecter terminal are electrically connected by the electro-conductive portion of the elastic connector.

At this time, since the elastic connector has a plurality of the elastic connectors sandwiching the non-electro-conductive portion, a plurality of data can be simultaneously transmitted from the output electrode to the connector terminal.

In the present invention, the sensor may preferably be a caliper having a main scale with a first measurement jaw provided at an end in the longitudinal direction and a slider movable in the longitudinal direction of the main scale and having a second measurement jaw to be in contact with the workpiece together with the first measurement jaw, and the circuit board, the output electrode and the connector hole may preferably be provided on the slider.

According to the above arrangement, when the measurement jaws provided on the main scale and the slider of the caliper are moved to be in contact with a target portion of a workpiece, the displacement of the slider is processed into signal as a measurement data to be transmitted to the output electrode.

When the projection of the connector terminal is inserted into the connector hole, the connector terminal and the output electrode are electrically connected through the electro-conductive portion of the elastic connector, the measurement data can be transmitted from the output electrode to the connector terminal.

When the projection of the connector is not inserted into the connector hole, the connector hole is shut by the elastic connector to isolate the outside from the output electrode. Accordingly, the invasion of the water, dust etc. from the outside through the connector hole into the output electrode and the circuit board can be prevented, and the situation where the data cannot be transmitted can be avoided, thus enabling to use the output-attached measuring instrument under severe environment.

Further, since the connector terminal and the output electrode are in contact through the elastic connector, secure contact can be obtained by the elastic contact pressure of the elastic connector and the connector terminal and the output electrode are less likely to be damaged even after repeated plugging and unplugging of the connector as compared to bringing the connector terminal and the output electrode into direct contact.

DETAILED DESCRIPTION OF PREFERRED EMBODIMENT(S)

An embodiment of the present invention will be described below with reference to the attached drawings.

Figure 3:
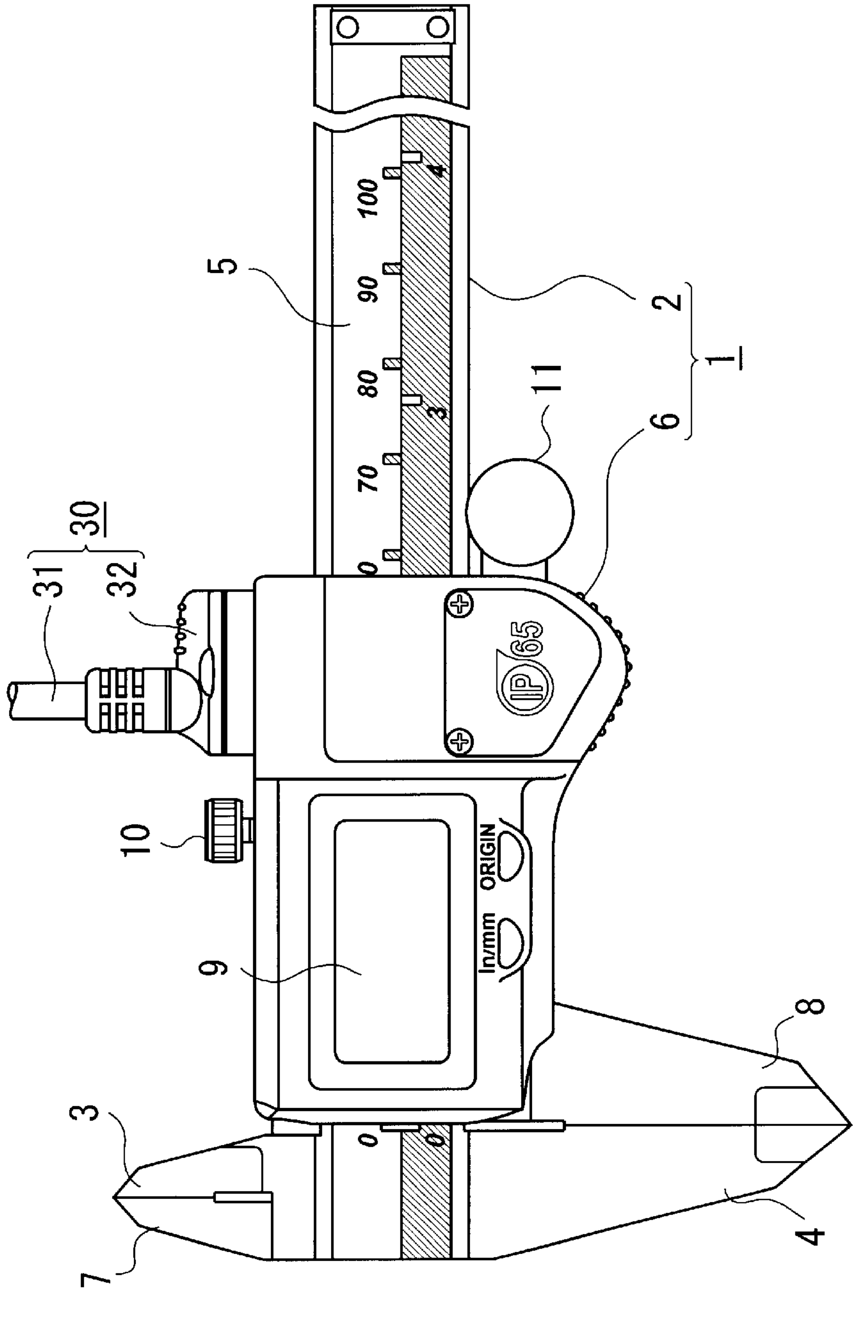
FIG. 3 is a front elevation of the aforesaid embodiment.

FIG. 3 is a front elevation of the output-attached measuring instrument according to the present embodiment.

As shown in the figure, the output-attached measuring instrument according to the present embodiment has a caliper 1 as a measuring instrument body capable of outputting a measurement data obtained by measurement, and a connection cable 30 for transmitting measurement data from the caliper 1 to an external device.

The caliper 1 has a main scale 2 having a longitudinal portion, and a slider 6 provided on the main scale 2 in a manner capable of slide movement along the longitudinal direction of the main scale 2.

The main scale 2 has an inside measurement jaw 3 and an outside measurement jaw 4 respectively provided on the upper and lower periphery on the base end of the longitudinal portion and a scale 5 provided at inner portion of the longitudinal portion along the longitudinal direction. The inside measurement jaw 3 and the outside measurement jaw 4 are respectively integrated to the main scale 2.

The outer surface of the slider 6 is provided with an inside measurement jaw 7 and an outside measurement jaw 8 respectively formed on the upper and lower periphery on the base end and a digital display 9 formed on the front surface thereof. Further, a clamp screw 10 for fixing the position of the slider 6 is screwed thereto and a feed roller 11 to be in contact with the longitudinal portion of the main scale 2 to move the slider 6 by rotation thereof is provided on the outer surface of the slider 6.

The inside measurement jaw 3 and the outside measurement jaw 4 are integrated with the slider 6.

Figure 1:
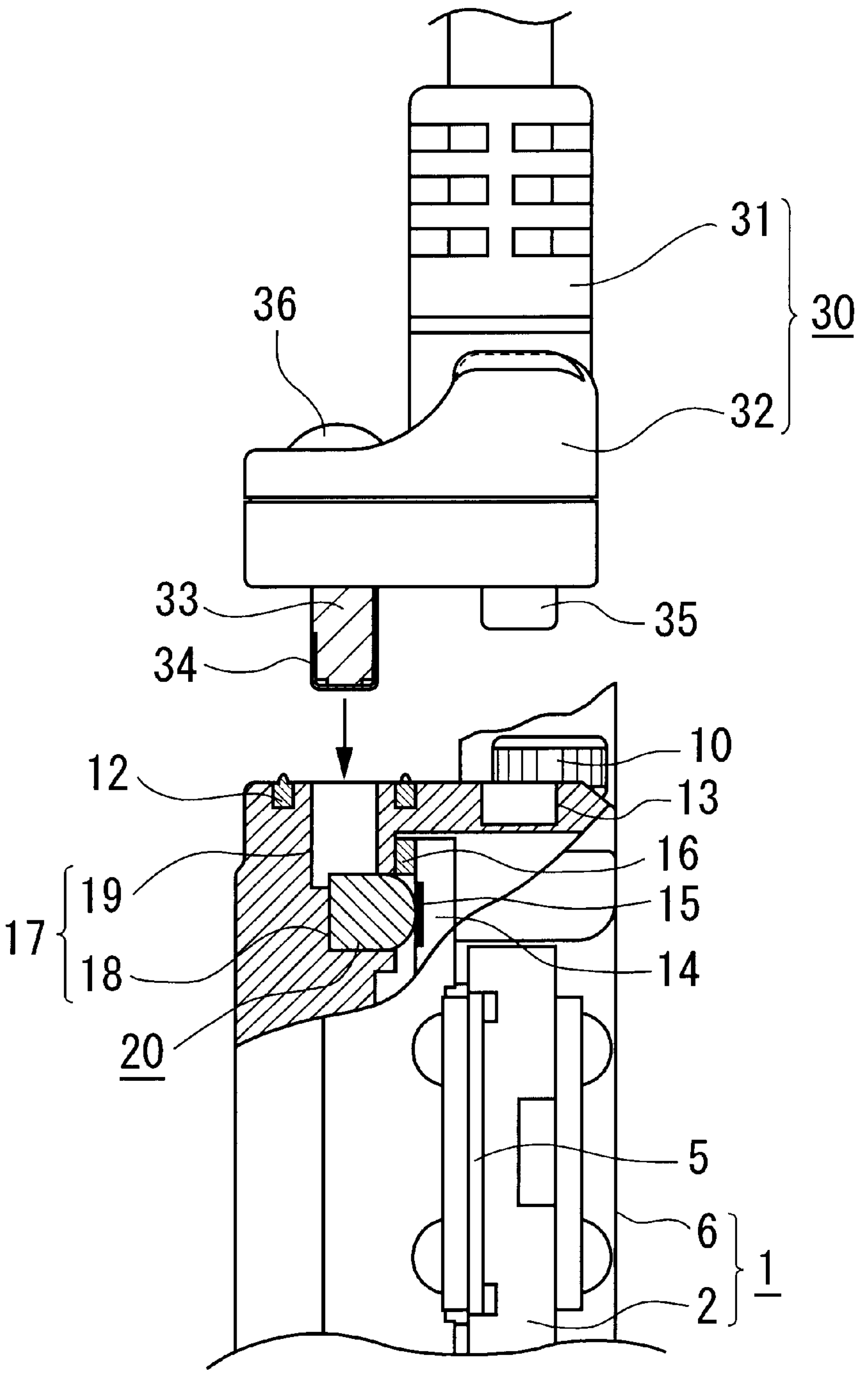
FIG. 1 is a cross section of an embodiment of the present invention, where a projection of a connector is unplugged from a connector hole.

As shown in FIG. 1, a detection head (not shown) for detecting the displacement of the slider 6 from the scale 5, a circuit board 14 for processing the measurement signal from the detection head as a measurement data, an output electrode 15 provided on the circuit board 14, a connector hole 17 extending from the output electrode 15 to be in communication with outer surface, and an interconnector 20 as an elastic connector provided inside the connector hole 17 are provided inside the slider 6.

The measurement jaws 3 and 4 of the main scale 2, the scale 5, the measurement jaws 7 and 8 of the slider 6 and the detection head constitute the sensor of a measuring instrument.

The circuit board 14 has a signal processor for processing the measurement signal from the detection head as a measurement data, the processed measurement data being sent to the output electrode 15 to be outputted to the outside and to the digital display 9 to be digitally displayed.

Figure 4:
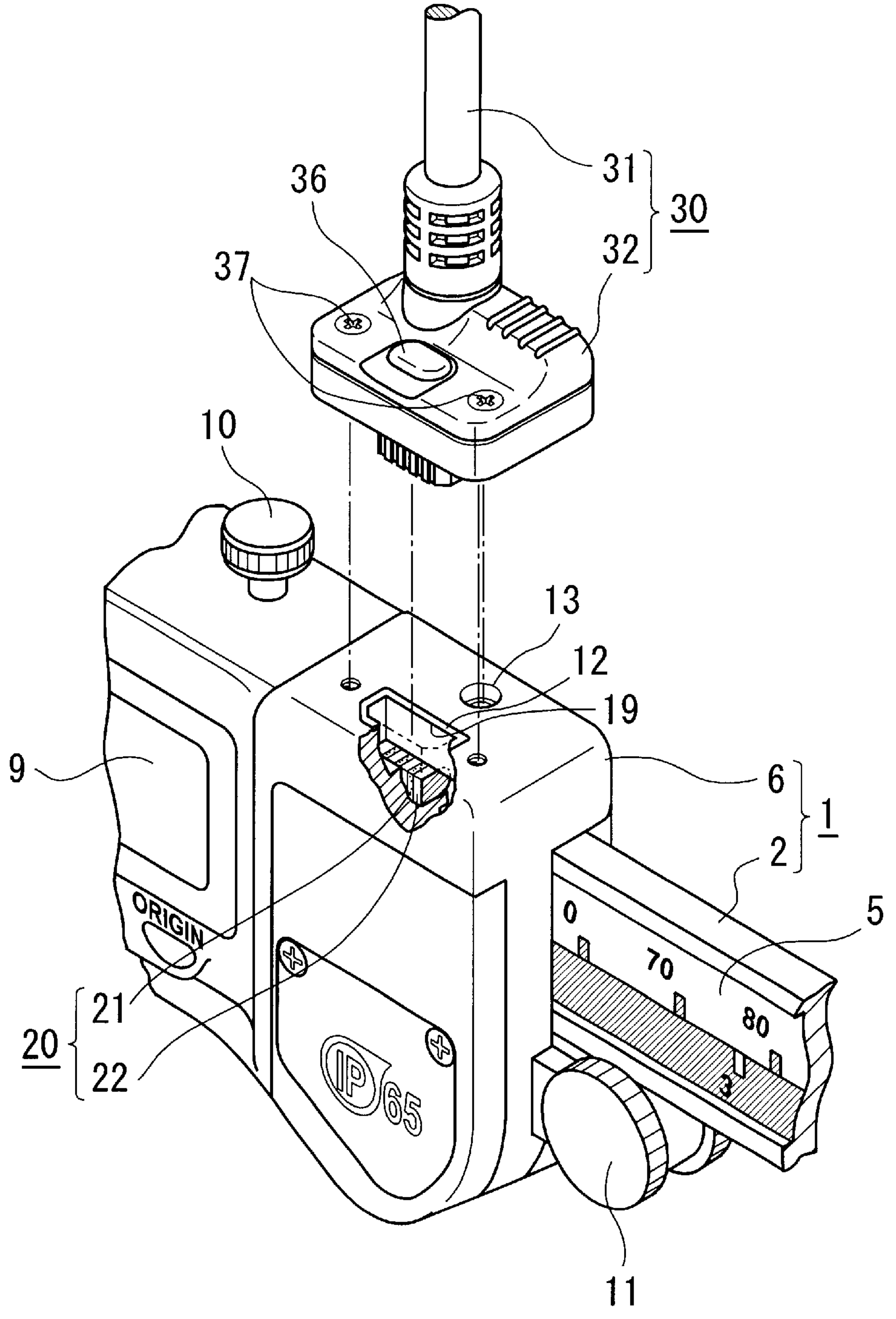
FIG. 4 is a perspective view of the aforesaid embodiment.

The connector hole 17 is composed of a perpendicular channel 18 extending perpendicularly relative to the output electrode 15, and an opening channel bent from an end of the perpendicular channel 18 at a right angle to be in communication with the outside. As shown in FIG. 4, the interconnector 20 is provided at the border of the perpendicular channel 18 and the opening channel 19 to close the opening channel 19.

Figure 5:
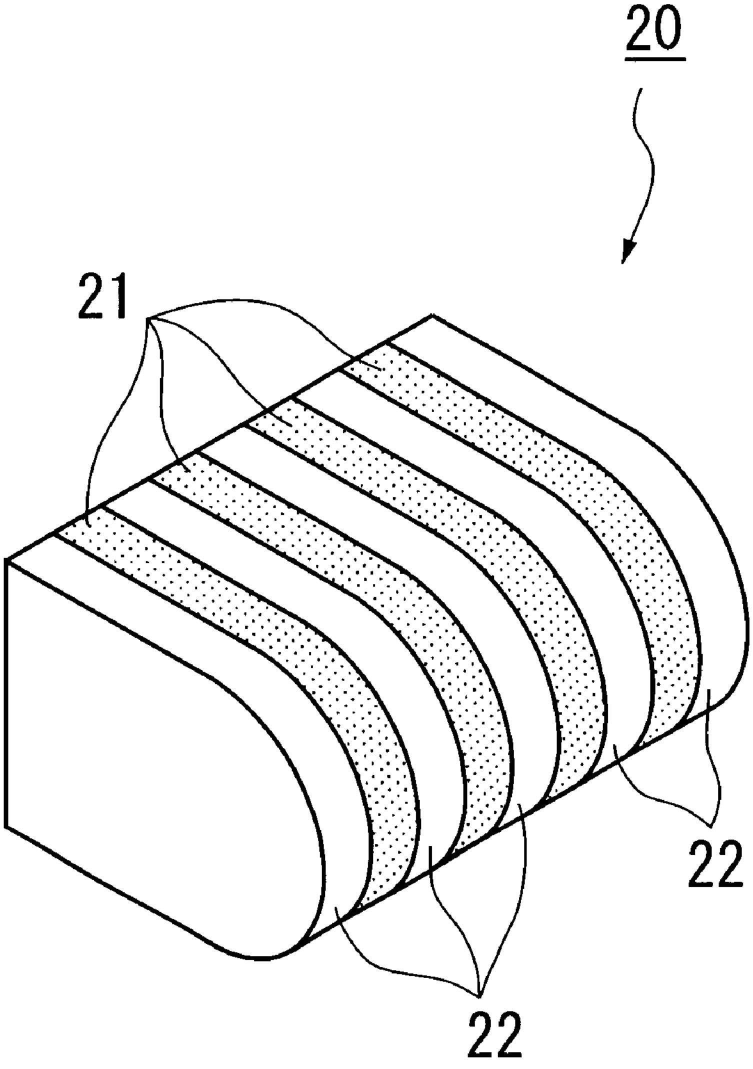
FIG. 5 is a perspective view showing an elastic connector of the aforesaid embodiment.

As shown in FIG. 5, the interconnector 20 has a columnar body having substantially square outer circumference, three of the circumferences being plane and the rest of the circumference being a convex curved surface, which is made of silicone rubber. The interconnector 20 has alternate lamination of an electro-conductive portion 21 containing carbon to be electro-conductive, and a non-electro-conductive portion 22 formed only by silicone rubber.

The interconnector 20 is disposed in the perpendicular channel 18 of the connector hole 17 so that the convex curved surface faces the circuit board 14.

A buffer rubber 16 is provided between the inner wall of the slider 6 and the circuit board 14. A ring-shaped elastic sealing member 12 formed by elastic rubber is fitted to surround the periphery of the opening of the connector hole 17 on the outer surface of the slider 6.

An engaging hole 13 is dug on the same side as the opening of the connector hole 17 of the slider 6.

The connection cable 30 has a cable 31 connecting the caliper 1 and an external device, and a connector provided on an end of the cable 31.

On a side of the connector 32 to be in contact with the slider 6, a projection 33 capable of being plugged to and unplugged from the connector hole 17 and having a connector terminal 34 being exposed on the surface thereof, and an engaging piece 35 to be fitted into the engaging hole 13 of the slider 6 are formed. A data transmission switch 36 is provided on the opposite side of the connector 32.

A setscrew 37 for fixing the connector to the slider 6 is provided on the connector 32.

The length of the projection 33 is arranged so that the projection 33 presses the interconnector 20 through the opening channel 19 of the connector hole 17. The distance between the convex curved surface of the interconnector 20 and the surface opposite thereto is substantially the same as or a little shorter than the perpendicular channel 18.

Thus structured output-attached measuring instrument is used during measurement as described below.

Initially, the slider 6 is moved by the feed roller 11 so that the measurement jaw 7 or 8 is in contact with a target portion of a workpiece together with the measurement jaw 3 or 4.

At this time, the displacement of the slider 6 is detected by the scale 5 provided on the longitudinal portion of the main scale 2 and the detection head of the slider 6, the detected measurement signal being processed as a measurement data by the circuit board 14 to be displayed on the digital display at the front side of the slider 6.

Figure 2:
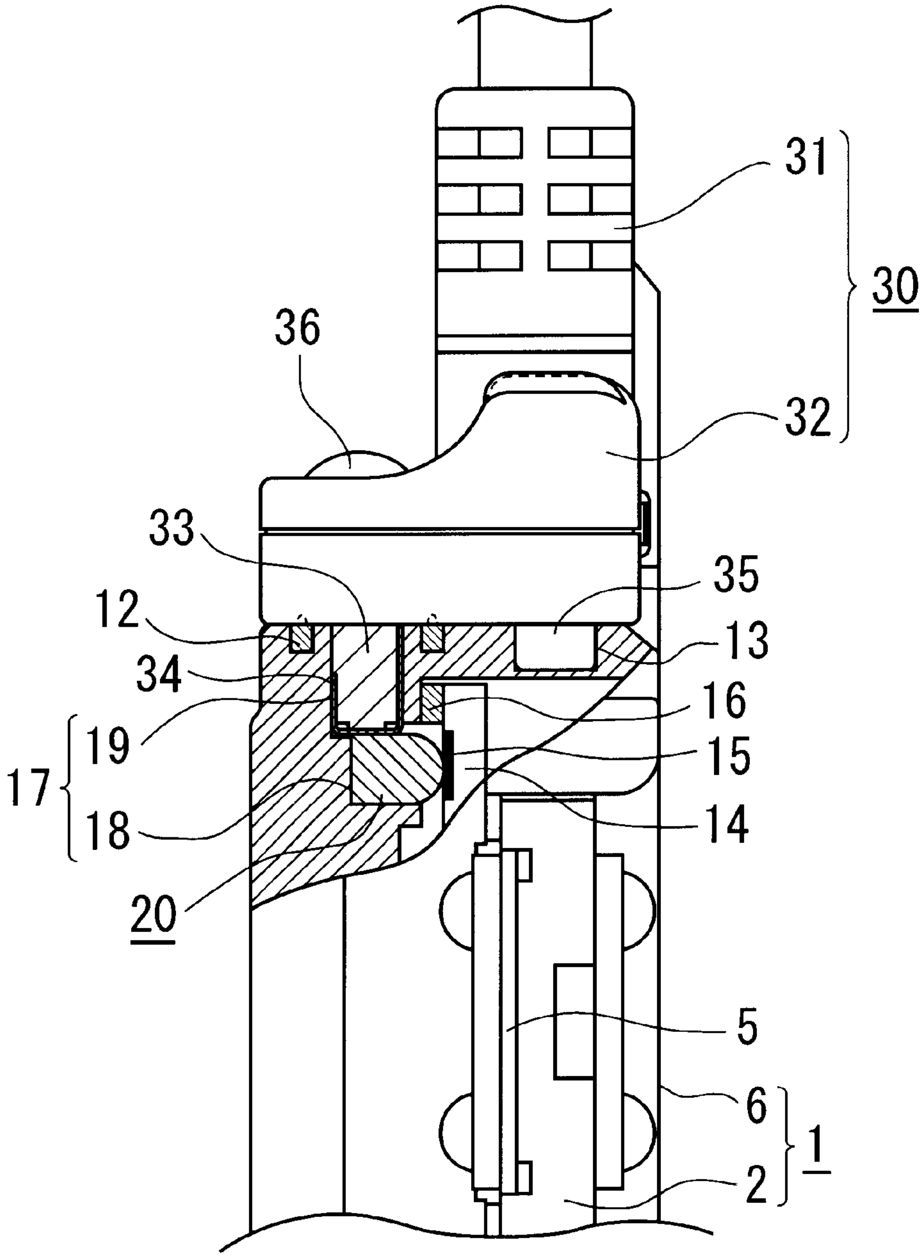
FIG. 2 is a cross section of the aforesaid embodiment, where the projection of the connector is plugged into the connector hole.

When the projection 33 of the connection cable 30 is plugged into the connector hole 17, the engaging piece 35 is inserted into the engaging hole 13 and the connector 32 is fixed to the slider 6 by the setscrew 37, then, as shown in FIG. 2, the connector terminal 34 is in contact with the interconnector 20. In other words, the output electrode 15 touches the connector terminal 34 through the interconnector 20. The unplugged end of the connection cable 30 is connected to an external device in the above condition, and the measurement data is transmitted to an external device by pressing the data transmission switch 36.

According to the output-attached measuring instrument of the present embodiment, following advantages can be obtained.

The connector hole 17 is composed of the perpendicular channel 18 extending perpendicularly from the output electrode 15 and the opening channel 19 extending from an end of the perpendicular channel at a right angle, and the interconnector 20 is provided in the perpendicular channel 18 to close the opening channel 19. Accordingly, as shown in FIG. 1, when the projection 33 of the connector 32 is unplugged from the connector hole 17, the interconnector 20 closes the connector hole 17 to isolate the output electrode 15 from the outside, so that invasion of water, oil, dust etc. from the connector hole 17 onto the output electrode 15 and the circuit board 14 can be prevented. As a result, damage on the internal circuit caused by water, oil, dust etc. can be prevented and the situation where the data cannot be transmitted can be avoided, thus enabling to use the output-attached measuring instrument under severe environment.

When the projection 33 is inserted from the opening of the connector hole 17, as shown in FIG. 2, the connector terminal 34 is in contact with the interconnector 20 and, being pressed by the projection 33, the interconnector 20 is elastically deformed in the perpendicular channel 18 to extend toward the output electrode 15, so that the interconnector 20 can be in contact with the output electrode 15 at a desirable pressure. As a result, the measurement data can be securely transmitted from the output electrode 15 to the connector terminal 34 through the interconnector 20.

Since a plurality of the electro-conductive portions 21 are provided to the interconnector 20 sandwiching the non-electro-conductive portion 22, a plurality of data can be simultaneously transmitted from the output electrode 15 to the connector terminal 34.

When the projection 33 is inserted to the connector hole 17, the interconnector 20 is elastically deformed, so that the connector hole 17 is not shut by the interconnector 20. However, since the elastic sealing member 12 is provided on the periphery of the opening, the connector hole 17 is isolated from the outside by the elastic sealing member 12 and a side of the connector 32 when the connector 32 is connected to the slider 6. Accordingly, the situation where the data cannot be transmitted by invasion of water, oil, dust etc. into the inside of the slider 6 can be avoided, thereby enabling the output-attached measuring instrument to be used under severe environment.

Further, the elasticity of the elastic sealing member 12 reduces the contact pressure between the connector 32 and the slider 6, thereby preventing damage on the connector 32 and the slider 6.

Since the engaging piece 35 provided on an end of the connector 32 and the engaging hole 13 provided on the outside of the slider 6 are engaged and the connector 32 and the slider 6 are fixed by the setscrew 37, the connection between the connector 32 and the slider 6 can be stabilized. Accordingly, the connector terminal 34, the interconnector 20 and the output electrode 15 are stably contacted, so that the measurement data can be securely transmitted.

Since the digital display 9 is provided on the caliper 1, the measurement can be conducted and the measurement result can be read solely by the caliper 1. Further, since the data transmission switch 36 is provided on the connector, whether the transmission of the measurement data should be conducted or not can be determined after checking the measurement value on the digital display 9 as necessary.

Since the buffer rubber 16 is provided between the circuit board 14 and the inner wall of the slider 6, even when the circuit board 14 is strongly pressed by the interconnector 20, the position of the circuit board 14 can be flexibly changed opposite to the pressing force from the interconnector 20. Accordingly, damage on the output electrode 15 on account of excessive load can be prevented.

Incidentally, the scope of the present invention is not restricted to the above embodiment, but includes following modifications.

Though the present invention is applied to the caliper 1 as a measuring instrument, the present invention can be applied to various measuring instruments such as micrometer and dial gauge.

The elastic connector may not be the interconnector 20 as in the above embodiment, but may be any elastic body having an electro-conductive portion.

The perpendicular channel 18 and the opening channel 19 of the connector hole 17 may not be arranged to cross at a right angle. Alternatively, even when the connector hole 17 is linearly provided, waterproofness and dustproofness can be obtained according to the present invention.

What is claimed is:

1. An output-attached measuring instrument, comprising:

a measuring instrument body having a sensor, a circuit board for processing a measurement signal from the sensor as a measurement data, an output electrode for outputting the measurement data from the circuit board, and a connector hole in communication with the output electrode and opening to an outer surface; and a connection cable having a connector capable of attaching to and detaching from the connector hole for transmitting the measurement data obtained by the measuring instrument body to an external device, the connector having a projection capable of being plugged to and unplugged from the connector hole and a connector terminal exposed on a surface thereof, wherein an elastic connector having an electro-conductive portion for electrically connecting the connector terminal and the output electrode is accommodated in a space of the connector hole of the measuring instrument body, and wherein the elastic connector shuts the connector hole when the projection is unplugged from the connector hole and electrically connects the connector terminal and the output electrode through the electro-conductive portion when the projection is plugged into the connector hole.

2. The output-attached measuring instrument according to claim 1, the connector hole comprising: a perpendicular channel perpendicular to the circuit board; and an opening channel bent from an end of the perpendicular channel and opening toward the outer surface of the measuring instrument body, wherein the elastic connector is provided in the perpendicular channel, the elastic connector shutting the opening channel when the projection is unplugged from the connector hole and electrically connecting the connector terminal and the output electrode while being elastically deformed when the projection is inserted into the connector hole.

3. The output-attached measuring instrument according to claim 2, wherein an elastic sealing member is provided along the periphery of the opening channel on the outer surface of the measuring instrument body, and wherein the elastic sealing member seals the gap between the measuring instrument body and the connector while being compressed when the projection of the connector is inserted into the opening channel.

4. The output-attached measuring instrument according to claim 1, wherein a plurality of the electro-conductive portions connecting a surface opposing the opening channel and a surface opposing the output electrode are provided to the elastic connector sandwiching a non-electro-conductive portion therebetween.

5. The output-attached measuring instrument according to claim 1, wherein the sensor is a caliper having a main scale with a first measurement jaw provided at an end in the longitudinal direction and a slider movable in the longitudinal direction of the main scale and having a second measurement jaw to be in contact with the workpiece together with the first measurement jaw, and wherein the circuit board, the output electrode and the connector hole are provided on the slider.

6. An output-attached measuring instrument connectable to a connection cable having a connector with a connector terminal and the connector having a projection, the output-attached measuring instrument comprising:

a measuring instrument body having a sensor, a circuit board for processing a measurement signal from the sensor as a measurement data, an output electrode for outputting the measurement data from the circuit board, and a connector hole in communication with the output electrode and opening to an outer surface, wherein an elastic connector having an electro-conductive portion for electrically connecting the connector terminal and the output electrode is accommodated in a space of the connector hole of the measuring instrument body, and wherein the elastic connector shuts the connector hole when the projection is unplugged from the connector hole and electrically connects the connector terminal and the output electrode through the electro-conductive portion when the projection is plugged into the connector hole.

7. The output-attached measuring instrument according to claim 6, the connector hole comprising: a perpendicular channel perpendicular to the circuit board; and an opening channel bent from an end of the perpendicular channel and opening toward the outer surface of the measuring instrument body, wherein the elastic connector is provided in the perpendicular channel, the elastic connector shutting the opening channel when the projection is unplugged from the connector hole and electrically connecting the connector terminal and the output electrode while being elastically deformed when the projection is inserted into the connector hole.

8. The output-attached measuring instrument according to claim 7, wherein an elastic sealing member is provided along the periphery of the opening channel on the outer surface of the measuring instrument body, and wherein the elastic sealing member seals the gap between the measuring instrument body and the connector while being compressed when the projection of the connector is inserted into the opening channel.

9. The output-attached measuring instrument according to claim 6, wherein a plurality of the electro-conductive portions connecting a surface opposing the opening channel and a surface opposing the output electrode are provided to the elastic connector sandwiching a non-electro-conductive portion therebetween.

10. The output-attached measuring instrument according to claim 6, wherein the sensor is a caliper having a main scale with a first measurement jaw provided at an end in the longitudinal direction and a slider movable in the longitudinal direction of the main scale and having a second measurement jaw to be in contact with the workpiece together with the first measurement jaw, and wherein the circuit board, the output electrode and the connector hole are provided on the slider.

* * * * *